Nov. 22, 1932. A. LOEHR, JR., ET AL 1,888,276
CINEMATOGRAPHIC APPARATUS
Filed Dec. 20, 1930 2 Sheets-Sheet 2
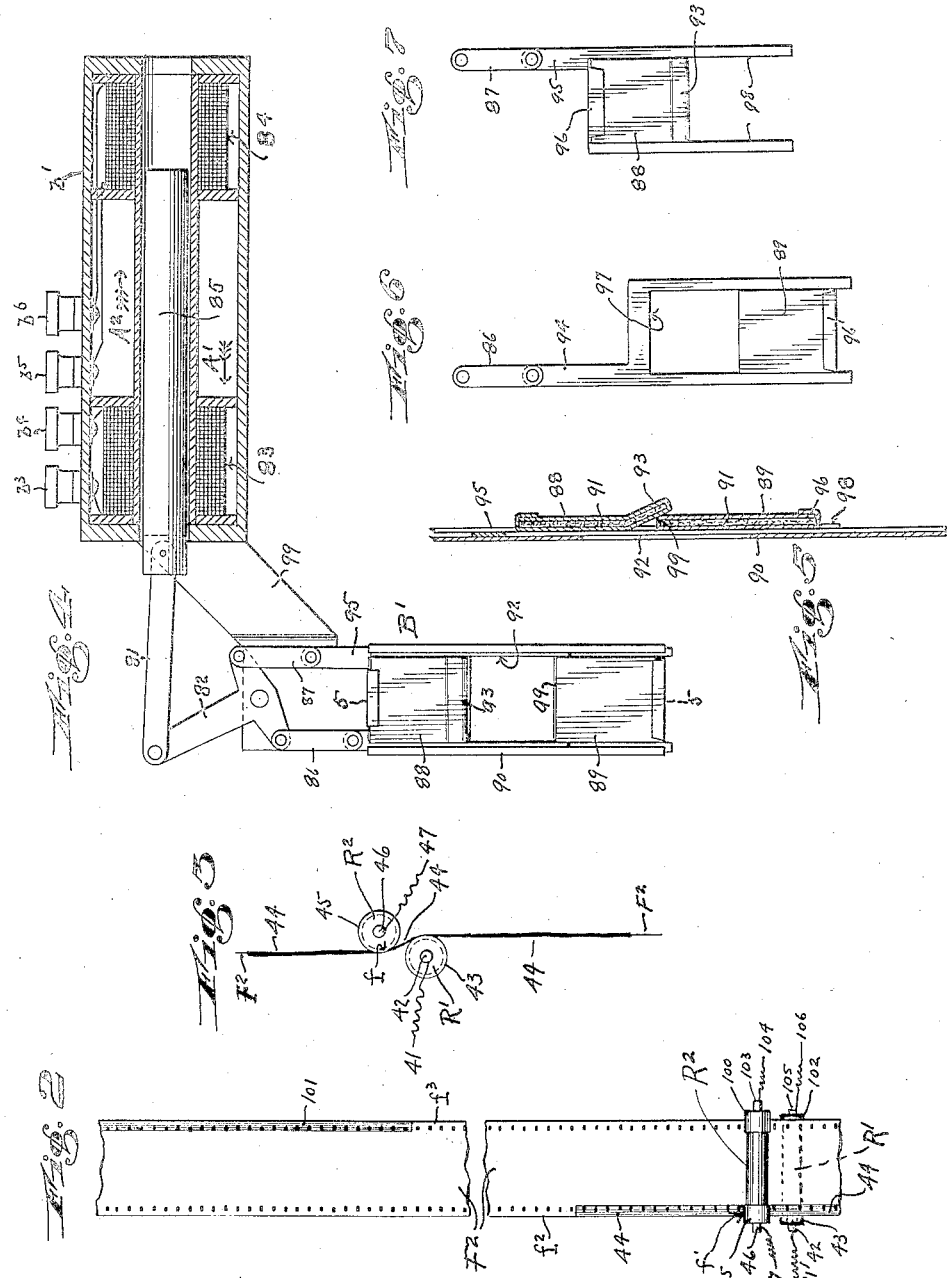
INVENTORS
Adolph Loehr, Jr. and
BY Edward S. Schwab
Alexander C. Proudfit, ATTORNEY.

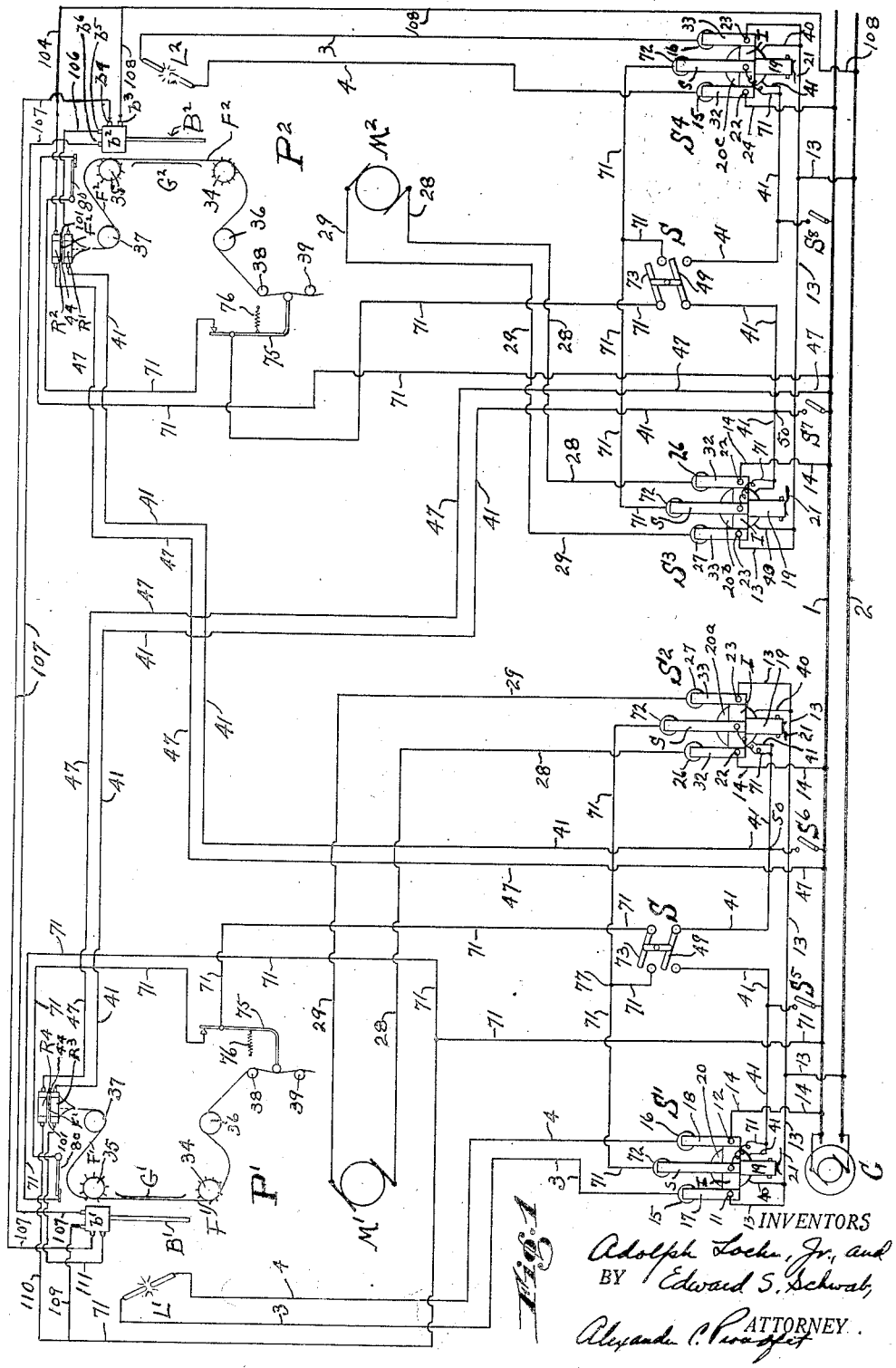

Patented Nov. 22, 1932

1,888,276

UNITED STATES PATENT OFFICE

ADOLPH LOEHR, JR., OF BRONX, NEW YORK, AND EDWARD S. SCHWAB, OF JERSEY CITY, NEW JERSEY, ASSIGNORS TO ADOLPH LOEHR, OF NEW YORK, N. Y.

CINEMATOGRAPHIC APPARATUS

Application filed December 20, 1930. Serial No. 503,846.

This invention relates to cinematographic projection apparatus, and is of particular utility when embodied in apparatus characterized by a plurality of projection machines operated in alternation for the continuous projection of films requiring several reels, although certain features of the invention are adapted for more general use, and are so claimed.

A more specific object of the invention is to provide means for automatically operating the plural sets of projectors above mentioned in such a manner that as the end of a film part on a reel in one of the projectors is approached, the preparatory movements in another projector necessary to initiate the operation of the film part of the reel therein will be started, without depending upon the volition of an operator, so that perfect continuity of action is assured.

A cognate object of the invention is to provide means for stopping automatically the operation of the first mentioned machine, and at the same time not only operating the conventional shutters or devices for effecting the "change-over" operation, by which the film running out is shielded, and another reel of film is exposed in another machine, but also shutting off automatically the current which energizes the lamp of the set in which the film is running out, so that the danger of fire and the destruction of the film is effectively prevented without requiring any action on the part of an operator.

At the present time it is customary to provide two operators, one for each of the projectors, which is a source of such expense in operation that some houses showing films are unable to avail of the more perfect continuity of exhibition made possible only by the use of two projectors, and therefore resort must be had to expedients for occupying the attention of the audience while a change of reels is effected in the single projector used.

This is so unsatisfactory to the spectators, who are accustomed to the more perfect presentation of continuous film features, that while excellent films are available to the houses employing only one projector, the spectators do not patronize such houses, but go to those where the continuity of showing can be seen.

Even where two operators are employed, the different personal equations of these individuals often results in imperfect co-ordination of the two projectors, and accordingly a desirable object effected by the present invention is to eliminate the personal equation entirely, in so far as it relates to the initiation of the successive action of the projectors and to the prevention of fire risk by proper stoppage of the projectors at the proper time, and the cutting off of current either at the times when a reel on one machine is exhausted, or when by reason of breakage of a film or failure of some part of the apparatus to function properly, it is desirable to shut down a projector.

A further object of the invention is to provide means for effecting the various mechanical operations, involved in the above automatic co-ordination of the projectors, by suitable devices controlled by the film.

Still another object is to provide such means for carrying the invention into effect that existing appliances used for other purposes can be made available for performing various steps in the operations required, and thus the reliability in operation of the invention is assured with a minimum of expense in its installation and but little instruction in its use.

Among other objects of the invention is the provision of an improved type of shutters for use in the vicinity of the film gates of the projectors respectively, our improvements being directed to increasing the speed of such shutters, providing a better balanced structure which operates more smoothly, also to provide a shutter capable of stopping the heat rays from the lamps, which are of such intensity as to penetrate existing shutters in a relatively short time.

The above, and other, features of the invention are illustrated and described fully in the accompanying drawings and specification, and are pointed out in the claims.

In the drawings,

Fig. 1 is a schematic view of the various elements of a plurality of projector sets and associated parts suitable for continuous film display, and shows the electrical circuits and controlling means provided in accordance with the present invention.

Fig. 2 is a fragmentary detail view in front elevation of a control part of the film and contacting rollers such as are indicated in Fig. 1.

Fig. 3 is a detail view in side elevation of the parts shown in Fig. 2.

Fig. 4 is a detail view in front elevation, on a larger scale, of one of the shutter devices, and its actuating mechanism.

Fig. 5 is a vertical sectional view on the line 5—5 of Fig. 4, on a still larger scale, and showing the shutter closed.

Figs. 6 and 7 are detail views, in front elevation, of the shutter members, taken separately.

In carrying the invention into effect, we provide means acting automatically at suitable predetermined intervals to initiate the energization of the lamp and motor of one projector set alternatingly with the lamp and motor of another projector set, as each set is to be brought into operation to display its reel of film; and we provide also means acting automatically at suitable predetermined times to deenergize the motor and lamp of the projector sets alternatingly; the times of such energization and de-energization being so co-ordinated in pursuance of the invention that the energization of the motor and lamp of one set precedes by a suitable interval the de-energization of the set in which a reel of film is being displayed, so that the successive display of film parts proceeds continuously in the co-ordinated sets, without intermission, until the desired number of reels of film have been displayed, when both sets are de-energized automatically.

We provide also means for operating automatically, at appropriate intervals, the shutter devices which are interposed between each lamp and the film in its set when the "change-over" of films is effected, to shut off display of one film and expose the appropriate part of the film to be displayed by the other set in perfect continuity.

Any suitable form of the several means requisite for automatic performance of the above operations respectively may be utilized, either mechanical or electrical, or both, and the various means hereinafter disclosed as a now-preferred combination of devices for the purpose are of an illustrative character only, possessing however certain advantages in operation which will be set forth in the specification and pointed out in the claims.

We prefer to utilize electroresponsive means controlled either directly or indirectly by the films in the several sets to accomplish the several operations, inasmuch as conventional projection apparatus includes many elements which are already operated or controlled by electrical circuits and may be readily co-ordinated suitably, for the purposes of the present invention, by relatively inexpensive and thoroughly dependable apparatus of a commercial character which can be readily installed and operated by those skilled in the art.

For example, the two principal elements of a projector set affected by our invention are the electric motors which actuate the film, designated by the reference characters $M'$ and $M^2$ respectively in the drawings, and the electric lamps $L^1$ and $L^2$ which illuminate the films respectively, these elements of the sets being operated by electric circuits which include a source of current, designated C in the drawings, and which energizes the motors, lamps and other devices, in the instance illustrated, and may be constituted by any ordinary power circuit available. Either direct or alternating current, or both, may be used, according to the requirements of particular installations, and the type of current source which may be available in any particular instance, such as a generator set, or direct or alternating current supply mains, as at 1 and 2.

The operation of these circuits may be controlled advantageously, for the purposes of the present invention, by electro-magnetic switches or relays, of which we prefer to provide two for each set, as indicated at $S^1$, $S^2$ and $S^3$, $S^4$, the switch $S^1$ being adapted to control the lamp $L^1$, and having terminals 11 and 12 to which are connected the leads 13 and 14 from the current mains 1 and 2 and terminals 15 and 16 to which are connected the conductors 3 and 4 running to the lamp, the switch comprising also blades 17 and 18 mounted on an insulating block I supported and operated by the armature 19 of a magnet 20 which is included in a controlling circuit forming part of the invention and to be hereinafter described more particularly, the switch referred to being preferably of the general type known as a relay, although any form of electroresponsive device suitable for the purpose may be utilized.

When the magnet 20 is energized by the control circuit, its armature 19 throws the blades 17 and 18 against the terminals 15 and 16, and current flows from the mains to energize the lamp $L^1$. When the magnet 20 is de-energized, a spring 21 turns back the armature 19 and blades 17 and 18, breaking the circuit to the lamp $L^1$, which is thus de-energized.

The switch $S^2$ may be of a similar type, for control of the motor $M^1$, and comprises terminals 22 and 23 to which are connected the conductors 13 and 14 from the current supply mains. It has also terminals 26 and 27 to which are connected conductors 28 and 29 leading to the motor $M^1$. The magnet $20a$ of the switch $S^2$ is in a control circuit forming part of the invention, to be described, and when energized its armature 19 is operated to throw the blades 32 and 33 against the terminals 26 and 27 and the motor $M^1$ is energized and operates the film $F^1$ by means of gears 34, 35, 36, 37, 38 and 39 which may be of conventional character, or of any suitable form, it being understood that a suitable operating connection (not shown) is provided between these gears and the motor, in well-known manner.

The control circuit for the motor control magnet $20a$ will be described first, and includes a conductor 40 which may conveniently be connected with the branch conductor 13 leading to one of the current mains 2, that being a convenient source of operating current for the control system embodying the invention. Any other suitable source of operating current may however be used.

Another conductor 41, leading from the magnet $20a$, is connected to one of the control devices forming part of the present invention, and which may conveniently take the form of a contact roller $R^1$, having a metal collar 43 which is electrically connected with the conductor 41 through the bearing 42, (see Figs. 2 and 3) the collar 43 being adapted to bear against one face edge $f^2$ of the film $F^2$ in another projector set, (see Fig. 1) designated generally by the reference character $P^2$ and which is operated by a motor $M^2$ through a set of gears which bear the same reference characters as those already described with reference to the projector set $P^1$, as they may be, and preferably are, identical in structure and function therewith.

The film $F^2$ is shown as running between the roller $R^1$ and a co-operating roller $R^2$, which has a metal collar 45 adapted to bear against the other face edge of the film $F^2$, as at $f$, so that at predetermined times electrical current may pass between the collars, upon passage therebetween of an electrically conductive film part 44 which may be of any suitable character, and is shown herein as a strip of metal foil affixed to the edge of the film in the form of a binding extending around the edge of the film and secured by a suitable adhesive, such as that used in piecing up a film.

With the collar 45, electrical contact is made through the bearing 46 from which a conductor 47 leads back to the supply main 1, and the magnet $20a$ is accordingly energized when electrical connection is established between the collars 43 and 45 by the film part 44, and the magnet, thus energized, throws the switch $S^2$, and the motor $M^1$ is energized and initiates the operation of the film $F^1$ in the projector set $P^1$.

This may be arranged to take place at any desired time, by suitable position of the part 44 on film $F^2$, which preferably will be arranged to start the film $F^1$ at the usual time before exhaustion of the film $F^2$, so that for several seconds the films $F^1$ and $F^2$ run in unison, insuring perfect continuity in the display of the picture, and in the rendition of the sound feature, if such is provided.

At the same time, the lamp $L^1$ of set $P^1$ is energized by the operation of switch $S^1$ in the manner already described briefly and which will now be described more at length, this being an important provision of the invention.

The actuation of switch $S^1$ at this time, when contact is made through the part 44 of film $F^2$ as just described, is accomplished as follows:

Conductor 13, leading from main 2, is connected to magnet 20 of switch $S^1$, as already described, and a conductor 41 leads from the magnet 20 through blade 49 of a double pole switch S, which is the main control switch of the system, to a point 50 where it is connected with the conductor 41, leading from magnet $20a$ of the motor control switch $S^2$.

Accordingly, when the part 44 of film $F^2$ closes the circuit through magnet $20a$ to operate switch $S^2$ for energization of motor $M^1$ of the projector set $P^1$, the current will flow from main 2 through conductor 13 to magnet 20, thence through conductor 41, switch part 49 (when closed) thence to point 50, along conductor 41 through film part 44 in projector set $P^2$ and back through conductor 47 to main 1.

Magnet 20 will be thus energized, and switch $S^1$ will be automatically closed to connect up the operating circuit of lamp $L^1$, by bringing blades 17 and 18 against terminals 15 and 16, so that current will pass from the mains 1 and 2 through conductors 13 and 14, blades 17 and 18, terminals 15 and 16 and conductors 3 and 4, to energize the lamp $L^1$. Thus the latter is automatically controlled by the film $F^2$ of the other projector set, through the film part 44.

To provide for similar control of the operation of lamp $L^2$ and motor $M^2$ in the projector set $P^2$ by the film $F^1$ in projector set $P^1$, the film $F^1$ also is provided with a contact-making part 44, adapted to co-operate with collars 43 and 45 on co-operating rollers $R^3$ and $R^4$ mounted on the projector set $P^1$, these being all similar to those already described, and adapted to control the operation of the magnets $20b$ and $20c$ of switches $S^3$ and $S^4$, which are in a circuit comprising conductors identical in arrangement and function with those already described, and designated by the same reference characters, part for part, so that they do not require further description, except to note that when the film $F^1$ is about to be exhausted, the operation of film $F^2$ is initiated, the system operating alternatingly to cause continuous display of the film in one or another set, as long as the projector sets are loaded with films.

Inasmuch as the electrical connection established by passage of the electrically conductive film part 44 is momentary, the conductive control being designedly situated near the end of each film, and as the active control exerted by the control part ends with the exhaustion of the film, we provide means to maintain the closed position of the switch in the other projector set, which completes the motor circuit for operating the film therein, until proper time for change over from the latter film, normally, and any suitable means may be adopted for this purpose.

As a now-preferred means for such maintenance, we have shown each of the switches $S^1$, $S^2$, $S^3$, $S^4$, as being of the self-maintaining type, by virtue of a third contact finger $s$ in each switch, which is adapted to connect up the switch magnet in a branch control circuit comprising the conductor 40 running to the branch conductor 13 which derives current from the current main, or running to any suitable source of electrical current, the branch circuit comprising also a conductor 71 which runs from the switch magnet wire 41 to the finger $s$, and from the terminal 72 contacted by switch finger $s$ to point 77 and thence to a part of the circuit which includes the part 73 of the main control switch S and also includes several safety devices, to be described, the conductor 71 being connected eventually to the main 1, completing the branch circuit between the mains and the auxiliary contact finger $s$, to energize the switch magnets 20 and 20a, 20b, and 20c.

Accordingly, any of the switches so provided with an auxiliary contact finger $s$, when once closed, remain closed as long as current passes through this branch circuit and the switch magnet energized thereby, so that the magnet holds the main switch blades in closed position and the motor or lamp controlled by that switch continues to operate or illuminate the film until the latter is exhausted normally, or until some abnormal condition arises, making it desirable to stop the motor.

In either event, the branch circuit may be opened, in pursuance of the invention, by any means suitably co-ordinated with the rest of the control system forming part of the invention, and in the case of simple running out of the film, or its stoppage or breaking and piling up, the branch circuit may be opened by operation of various forms of safety or circuit controlling devices desirably provided in conventional projector apparatus for the purpose of stopping the motor under such conditions.

For example, when the film runs out normally, the motor controlling switch may be opened by the conventional trigger device 75 which constitutes a switch normally held closed by the presence of the film, against which it bears, and in the absence of which the trigger is free to swing open, being urged toward the open position by a spring 76. This conventional trigger control may be included in the branch circuit, and will open the latter and spring the motor controlling switch when the film runs out, and also when the film breaks, so that the film no longer supports the trigger, this controlling trigger acting as a safety device in the latter event.

Another conventional safety device takes the form of a switch 80 adapted to be thrown open by piling up of the film at any selected region, as for example if the film becomes jammed in passing through the conventional display gate G.

These safety devices, and/or others, may be included, in any desirable number, in series or otherwise with each other in the branch circuit, and can be utilized to perform their characteristic conventional functions in co-operation with other devices which are novel with the present invention, no claim being made to the conventional devices as such, but rather to the co-ordination of such devices in a plurality of projector sets for the automatic display of a plurality of films in continuous succession. The motor may, accordingly, be stopped by opening of the branch control circuit 71 through the automatic operation of any one or more of these safety devices, or by the manual actuation of the main control switch S of conventional, or other suitable form, and at the same instant the lamp of the set is de-energized automatically.

This co-ordination of each lamp switch with controlling means operated by the films in both of the projector sets and the automatic de-energization of the lamp whenever the film stops for any reason makes it virtually unnecessary to provide the "dowser" device usually forming part of conventional projector sets, by which a metal damper is dropped between the lamp and the projector, but it will be understood that by the provision of suitable connections, the operation of existing dowser devices may be co-ordinated with the controlling circuits above described, so that no illustration has been made of a dowser device, nor of other devices for various purposes which are not necessary to the successful operation of the present invention, but may be used, in conjunction therewith, either independently, or in co-ordination with our novel control system, which lends itself readily to the automatic operation of such additional devices as the user may desire to utilize.

In further pursuance of the primary object of the invention, which, as already stated, is to provide for perfect continuity in the display of the series of film parts, reel after reel, we have provided means, acting in an entirely automatic manner, to operate the shutters conventionally employed in connection with the film gates in the respective projector sets, the shutter of one projector being closed as the shutter of the other set is opened.

With these shutters in use, only one film is under projection at a time, although both are necessarily running at the time of the change over, and in an existing type of shutter apparatus for this purpose a certain degree of co-ordination has been accomplished by the use of solenoids in each of the projector sets, included in an operating circuit which is controlled by a foot-operated switch or switches, one of these switches being usually provided at each projector set.

Such existing mechanism our invention may, and preferably does, utilize to effect the change-over, novel means having been devised by us to co-ordinate the operating circuits with our automatic control system, preferably in the manner now to be described.

In each projector set we provide such a shutter designated generally by the reference characters $B^1$ and $B^2$, with suitable actuating means, preferably comprising solenoid devices, indicated generally by the reference characters $b^1$ and $b^2$, each of which devices may desirably comprise a pair of solenoids, as illustrated in detail in Fig. 4, at 83 and 84, or any suitable device of an analogous character may be provided.

The solenoids in each set act upon a reciprocable plunger 85 which is connected by a link 81, bell-crank lever 82 and links 86 and 87 with the members 88 and 89 of the shutter $B^1$, the links 86 and 87 being connected pivotally with extensions 94 and 95 forming parts of the leaves of the shutter, which leaves are adapted to be moved toward and away from each other, in balanced relation, to close or open an aperture 92 formed in the frame 90, and which aperture is in alignment with the conventional aperture in the film gate $G^1$.

The shutter member 89 has an opening 97 for the above purpose (see Fig. 6) and the member 88 has legs 98, spaced apart for a similar purpose, and which aid to insure steady, sliding movement of the member 88 in the frame 90.

In pursuance of an important object of the invention, the shutter parts 88 and 89 are preferably formed in a manner which constitutes the shutter a novel and highly efficient shield to protect the film from the intense heat rays emitted by the projector lamp, which have been known to penetrate the conventional shutters formed out of sheet metal. Our novel shutter is provided with a layer of heat-resisting material such as asbestos, with which each of the shutter leaves 88 and 89 are provided as illustrated at 91. Each leaf is preferably formed of a plurality of layers of sheet metal embracing and protecting the layer of asbestos substantially as shown in Fig. 5, and the leaf 88 is formed with a lip 93 adapted to overlap the contiguous edge 98 of the leaf 89 when the shutter is closed.

A bracket 99 serves to connect the solenoid $b^1$ with the shutter $B^1$, holding these parts rigidly in position for cooperation. The assembled parts may be mounted on the machine in the conventional position by any suitable means.

Each shutter is opened by movement of its plunger 85 in the direction indicated by the arrow $A^1$ when current passes through the solenoid 83 of either pair and is closed by movement of the plunger in the direction indicated by the arrow $A^2$ when current passes through the solenoid 84 of either pair. Each solenoid 83 of one pair is connected in series with the solenoid 84 of the other pair by a conductor 107, the solenoid devices being preferably provided with binding posts $b^3$, $b^4$, $b^5$ and $b^6$ to facilitate attachment of the conductors. In the diagrammatic showing of these connections in Fig. 1, the connections are indicated at two sides of the devices $b^1$ and $b^2$ respectively, for the sake of clearness in illustration, but in the actual structure the binding posts may be conveniently placed in a row on top of the solenoid devices, as shown in Fig. 4, or elsewhere.

The solenoid devices may be actuated by current derived from any convenient source, as for example by current from the supply mains 1 and 2, for which purpose a conductor 108 is shown in Fig. 1, running from the supply main 2 to the binding post $b^6$ of the solenoid device $b^2$, and a conductor 109 runs from the binding post $b^3$ of the solenoid $b^1$ to the branch conductor 71, which derives current from the supply main 1.

In accordance with our invention, the operation of the shutters to effect the change-over is co-ordinated with the motor control and lamp control preferably, although it is to be understood that the operation of these shutters automatically, instead of by a manual control, constitutes a feature of the invention which is susceptible of use advantageously as such, and it is therefore claimed generically, and by whatever means it is carried into effect, the now preferred means illustrated being shown merely by way of example.

The means selected for illustration comprises a binding of metal foil 101 on the edge of film part $F^2$, (see Fig. 2) at the other side from the similar strip 44 already described in connection with the motor and lamp control circuit, it being understood that a similar binding is provided on film $F^1$.

The binding 101 on film $F^2$ is adapted to co-operate with collars 102 and 100 on the rollers $R^1$ and $R^2$ already described, the body of each roller being preferably formed of non-conductive material, so that the collar 102 is insulated from the collar 43, and the collar 100 is insulated from the collar 45.

The collar 100 of roller $R^2$ is connected to the conductor 108 by a conductor 104 running from bearing 103, and the collar 102 is connected to the binding post $b^5$ of the solenoid device $b^2$ by a conductor 106. So, when the circuit is closed by passage of the film part 101 between collars 100 and 102, the current flows from the main 2 through conductors 108 and 104, the collar 100, film part 101 and collar 102, and conductor 106 through the solenoid 84 of device $b^2$, conductor 107 to solenoid 83 of device $b^1$, thence by conductors 109 and 71 to the main 1; with the result that solenoid 84 throws the plunger 85 of device $b^2$ to close the shutter $B^2$, and solenoid 83 throws the plunger 85 of device $b^1$ to open the shutter $B^1$, and the change-over from display of film in set $P^2$ to the display of film in set $P^1$ is effected automatically and instantaneously.

The contact-making part 101 of film $F^2$ is so placed, relatively to the contact making part 44 on said film as to effect the change-over at such an interval after the motor $M^1$ and lamp $L^1$ have been energized that the film $F^1$ will be travelling at the same speed as that of the part of film $F^2$ about to run out in the set $P^2$, and thus perfect continuity of display will be insured.

So, also, the collar 100 of roller $R^4$ in set $P^1$ is connected by conductor 110 to the branch conductor 71 leading from main 1, and the collar 102 of roller $R^3$ is connected by conductor 111 through the solenoid 84 in the solenoid device $b^1$, and thence by conductor 107 through solenoid 83 of device $b^2$, and by conductor 108 to main 2, with the result that when the circuit is completed by passage of the conductive part 101 of film $F^1$ between rollers $R^3$ and $R^4$, the current will pass from main 1 through conductors 71 and 110, collar 100 of roller $R^4$, film part 101 of film $F^1$, collar 102 of roller $R^3$, conductor 111 to device $b^1$ and conductor 107, solenoid 83 of device $b^2$, and by conductor 108 to main 2, acting to close the shutter $B^1$ and to open the shutter $B^2$.

The change-over from display of film $F^1$ to display of film $F^2$ is thereby effected automatically, in accordance with the invention.

As already described, the various circuits in each set can be opened at any time by operation of the main control switch S, as for example, when the display of film is completed, at the close of a performance. The motors and lamps are then in their de-energized condition.

As it is desirable at times to operate a lamp or a motor without running a film, in order to test and adjust the lamp, or to limber up the motor, preparatory to a performance, provision is preferably made, in pursuance of the invention, to permit the operator to energize either of the lamps, while the main control switch S of the set and its dependent circuits remain open. For this purpose a manually operated switch $S^5$ is shown in Fig. 1, adapted to pass current from the main 1 to the conductor 41 leading to magnet 20 of the switch $S^1$, which energizes lamp $L^1$, in the manner already described. After testing and adjusting that lamp, the motor $M^1$ may be similarly energized by operation of a suitable switch $S^6$ provided for the purpose of passing current from main 1, through point 50 and conductor 41 to the magnet 20a of switch $S^2$ which controls motor $M^1$.

The set $P^2$ is provided with similar switches $S^7$ and $S^8$ which require no further description.

When the operation of each lamp and motor individually for such tests, etc., has been accomplished, the switches $S^5$, $S^6$, $S^7$ and $S^8$ will be opened, and the apparatus will then be ready for operation as a system. The main control switch S of each set will first be closed, and then either of the switches $S^5$ or $S^6$ in the set $P^1$ may be closed momentarily to energize either of the switches $S^1$ or $S^2$ in set $P^1$ and either of the switches $S^7$ or $S^8$ will be closed momentarily to energize either of the switches $S^3$ or $S^4$ in set $P^2$.

Thereafter the system will operate automatically in the manner already described in detail, as long as there is a film in each set, the films being displayed automatically and successively in perfect continuity.

It is to be noted that this continuity persists for an indefinite number of change-over operations without any necessity for re-setting of the shutters by hand, or for any manual intervention in the operation of the system other than the simple removal of each film reel as exhausted, and each companion reel containing the exhibited section of film wound thereon, and substituting therefor a film reel containing a section of film to be exhibited and an empty reel upon which last mentioned film is to be received in the course of exhibition.

We claim:

1. Cinematographic apparatus characterized by a plurality of projector sets each comprising a lamp and a projecting machine, and each further characterized by a shutter interposed in the path of the light passing through the film from the lamp in each set, also by devices acting automatically concurrently with the passage of the film to open the shutter in one set and simultaneously to close the shutter in another set, and devices acting automatically concurrently with the passage of the film to energize the motor and lamp of the set in which the image is to be projected, prior to the opening of its shutter, thereby effecting instantaneous change-over of projection automatically, said shutter-actuating devices comprising means associated with the film and moving synchronously with the film to operate at a sufficient interval of time subsequently to the starting of the motor and lamp in the projector set in which the display of film is to be initiated to permit said film to attain substantially the same speed as that of the film in the other set; whereby both films are caused to run at the same speed at the time of the change-over operation.

2. Cinematographic apparatus characterized by a plurality of projector sets each comprising a lamp and a projecting machine, and each further characterized by a shutter device interposed in the path of the light passing thru the film from the lamp in each set, also by means acting automatically under the control of the film to open the shutter device in one and simultaneously to close the shutter device in another set; and means acting automatically under the control of the film to energize the motor and lamp of the set in which the image is to be projected, prior to the opening of its shutter, thereby effecting instantaneous change-over of projection automatically said shutter-actuating means being adapted to operate at a sufficient interval of time subsequent to the starting of the motor and lamp in the projector set in which the display of film is to be initiated to cause said film to operate concurrently with, and at substantially the same speed as, that of the film in the other set; and film-controlled means acting automatically to de-energize the lamp and the motor of the last mentioned set approximately at the time of closing its shutter.

3. Cinematographic apparatus characterized by a plurality of projector sets each comprising a film support, a film gate, a motor for propelling the film through said gate, a lamp for illuminating said film, and a shutter for interposition in the path of the light rays passing through said film from each of said lamps; said apparatus being further characterized by change-over devices acting automatically concurrently with the passage of the film to cause said sets to operate in alternation for the projection in continuous succession of a plurality of film parts respectively supported in said sets, said change-over devices comprising a film-controlled switch and connections to cause the energization of the motor and lamp of a projector set until then inoperative, and a subsequently acting film-controlled switch and connections to open the shutter of said last mentioned set, and simultaneously to close the shutter of the set from which the changeover is being made, and a third film-controlled switch and connections to cause de-energization of the lamp and motor of the set until then projecting.

4. Cinematographic apparatus characterized by a plurality of projector sets characterized respectively by the elements set forth in claim 1 and combined and co-operating as recited therein, including lamps, motors, shutters, and change-over devices, said change-over devices being adapted to act automatically to effect both opening and closing movements of said shutters at every change-over operation, and also to effect said appropriate energization and de-energization of said lamps and motors respectively, for an indefinite number of said change-over operations.

5. Cinematographic apparatus characterized by a plurality of projector sets, each comprising a film support, a film gate, a motor for propelling the film through said gate, a lamp for illuminating said film, and a shutter for interposition in the path of the light rays passing through said film from each of said lamps; said apparatus being further characterized by electro-responsive means and associated switches and connections to co-ordinate the operation of said projector sets and adapted to act automatically to cause said sets to operate in alternation for the projection in continuous succession of a plurality of film parts respectively supported in said sets, causing energization of the lamp and motor and subsequent opening movement of the shutter of each set to which changeover is to be effected and simultaneous closing of the shutter in the set from which changeover is being effected, and de-energization of the lamp and motor of the latter set, for an indefinite number of change-over operations, and electro-responsive means including a magnetic switch for each of said motors and lamps respectively, and electrical circuits provided with controlling devices operated by the respective films to cause energization and de-energization of the motor and lamp and appropriate movement of the shutter respectively in each set in proper sequence to effect said changeover operations as long as each set contains a film; and films in said sets respectively provided with a plurality of electro-conductive parts each adapted to form a portion of one of said electrical circuits controlling a portion of said electro-responsive means.

In testimony whereof we have signed this specification.

ADOLPH LOEHR, Jr.
EDWARD S. SCHWAB.